United States Patent Office 3,845,176
Patented Oct. 29, 1974

3,845,176
PROCESS FOR MAKING PHOS-
PHONOTHIOUREIDES
W. David Weir, Levittown, Pa., assignor to Rohm and
Haas Company, Philadelphia, Pa.
No Drawing. Filed Oct. 18, 1972, Ser. No. 298,683
Int. Cl. A01n 9/36; C07f 9/24
U.S. Cl. 260—984                                11 Claims

ABSTRACT OF THE DISCLOSURE

A multi-step process, requiring only a single, final purification, for preparing the compounds shown hereinbelow, which are anthelmintics, wherein Y is O or S;
R is lower alkyl sulfonyl, benzenesulfonyl, substituted benzenesulfonyl, lower acyl, benzoyl or substituted benzoyl;
R' is lower alkyl, lower alkoxyalkyl, halo-lower alkyl, phenyl or substituted phenyl;
X represents from one to four substituents which may independently be hydrogen, lower alkyl, lower alkoxy or halogen; and M is a cation having a water-soluble chloride; by the following reaction sequence:

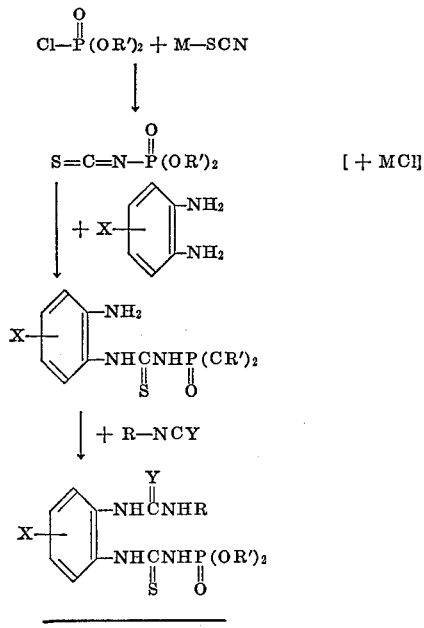

CROSS-REFERENCE TO RELATED APPLICATION

U.S. Patent Application Ser. No. 263,378, filed June 5, 1972, discloses certain compounds and their use as anthelmintics which may be made by the process of the present invention.

BACKGROUND OF THE INVENTION

Field of the Invention

The present invention relates to a process for preparing certain 1 - (3 - di-substituted phosphonothioureido)-2-(3- substituted ureido or thioureido) benzene compounds in which only a single reaction container is required and in which only a single purification workup need be performed.

Brief Description of the Prior Art

According to the general methods of the prior art, preparation of the subject compounds would require purification of each intermediate before entering into further reactions, necessitating the use of costly apparatus to transfer and purify the intermediates. Such a process results in loss of material through nonquantitative recovery of each intermediate product and hence in substantially lower overall yield. Furthermore, fresh solvent would be required for each reaction step. Thus it is an expensive route to the subject compounds. An efficient and economical process for making the subject compounds is desirable, since many of them are highly useful broad spectrum anthelmintics.

SUMMARY OF THE INVENTION

The following compounds may be prepared by the process of the present invention:

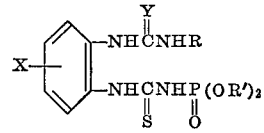

whrein Y may be O or S; R may be lower alkyl sulfonyl e.g. methanesulfonyl, ethanesulfonyl), benzenesulfonyl, substituted benzenesulfonyl (e.g. 3,4-trimethylenebenzenesulfonyl), lower acyl (e.g. acetyl, propanoyl), benzoyl or substituted benzoyl; R' may be lower alkyl (e.g. methyl, ethyl, isopropyl, n-butyl), lower alkoxyalkyl (e.g. methoxyethyl), halo-lower alkyl (e.g. 2-chloroethyl), phenyl or substituted phenyl; and X represents from one to four substituents which may independently be hydrogen or a lower alkyl (e.g. methyl, ethyl), lower alkoxy (e.g. ethoxy) or halogen (e.g. chloro) substituent at the 3, 4, 5 and 6 position of the benzene ring.

The terms "substituted phenyl," "substituted benzenesulfonyl" and "substituted benzoyl" refer to structures containing a benzene ring substituted meta or para to the point of attachment to the rest of the molecule, wherein the substituent(s) may be unreactive group(s) such as lower alkyl, nitro, halogen, lower alkoxy, halo lower alkyl or dialkylamino. Small substituents may be ortho to the point of attachment as well.

The process of the present invention comprises the following steps:
1. A thiocyanate salt and a chlorophosphate having the formula

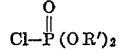

wherein R' is as defined hereinabove, are suspended in an appropriate reaction solvent such as 1,2-dimethoxyethane (hereinafer "glyme") and permitted to react, forming the phosphonoisothiocyanate

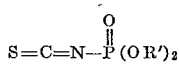

2. An amount of o-phenylenediamine (or substituted o-phenylenediamine) which is equimolar with the phosphonoisothiocyanate produced in the preceding step is then added to the reaction suspension and permitted to form the 1-(di-substituted phosphonothioureido)-2-amino benzene compound

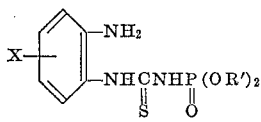

3. An amount of isocyanate or isothiocyanate having the formula Y=C=N—R which is equimolar with the benzene compound produced in the preceding step is then added to the reaction suspension and permitted to react to form the final product.

4. The product is recovered by physical separation, such as filtration or centrifugation and decantation from the reaction suspension. Water wash removes the salt formed.

DETAILED DESCRIPTION

Solvent.—The reactions of the present process are carried out in an inert (i.e. non-hydroxylic, non-amine) organic solvent boiling at least 30° and preferably at least 60° (temperatures expressed herein in degrees Celsius), and in which the organic reagents of the present process are soluble. Such solvents include non-hydroxylic oxygenated compounds such as glyme, diethyl ether, ethyl acetate and butyl acetate; halogenated hydrocarbons such as methylene dichloride, ethylene dichloride, chloroform and carbon tetrachloride; non-amine, nitrogen-containing compounds such as acetonitrile; and aromatic compounds such as benzene. To prevent side reactions, water should be absent from the system.

The amount of solvent used to produce a given amount of product may vary widely. In general, it is necessary to use enough solvent to dissolve the organic starting materials and to facilitate stirring and yet not use so much solvent that the recovery of the final product is made difficult. Preferably, from about 300 ml. to about 5 liters of solvent should be present per mol of product to be made, and most preferably between about 1 and 2 liters.

Step 1.—The thiocyanate salt reagent used in the first reaction may be an alkali metal thiocyanate such as NaSCN, KSCN and LiSCN; an alkaline earth thiocyanate such as $Ca(SCN)_2$ and $Ba(SCN)_2$; ammonium thiocyanate; or in general the salt of a cation having a water-soluble chloride.

The two reagents for the first reaction should be employed in substantially equimolar amounts. It is preferred to suspend the thiocyanate in the solvent and then to add the chlorophosphate to the mixture, although the reagents could also be added together to the solvent or even in reverse order.

This reaction may be carried out between about 10° and 80°, up to reflux temperature or under pressure if desired, and preferably in the range of 20° to 35°. Upon addition of the reagents, the product appears to be formed instantaneously, but in the preferred temperature range of 20° to 35°, it is desirable to permit the reaction to proceed for at least about one-half hour and preferably about two hours, with agitation such as by stirring. Longer reaction times, e.g. 18 hours, have been employed with similar results.

Step 2.—Following completion of the first step, the o-diamino benzene compound is added to the reaction mixture. The amount added should be substantially equimolar with the phosphonoisothiocyanate produced in the first step, the yield of which may be estimated by performing a separate test run of this step and recovering the product. It is important to use sufficient diamino benzene compound, since the desired reaction involves only one of the two amine sites, and the presence of an excess of phosphonoisothiocyanate would tend to produce some *bis* product as well.

It is also important to perform this reaction below about 50°, in order to avoid *bis* formation. Preferably, the temperature may be between about 10° and 45°, and most preferably 20° and 35°.

The reaction takes place almost instantaneously and may be considered substantially complete after as little as ten minutes with agitation. Preferably this step may be completed in about 45 minutes to an hour, and longer times are entirely feasible.

Step 3.—Following completion of the second step, the desired isocyanate or isothiocyanate is added to the reaction mixture, in an amount which is at least equimolar wth the 1-amino-2-(di-substituted phosphonothioureido)-benzene compound formed. For this purpose, one may safely assume 100% yield in the second step reaction, since even if this estimate were overly optimistic, an excess of isocyanate or isothiocyanate reagent would not be detrimental to this final reaction step.

The temperature may range from about 10° to 80°, unless the final product shows a tendency to form the benzimidazole by ring closure with elimination of hydrogen sulfide, in which case the maximum should be suitably lowered. In any event, it is most preferable to perform the reaction between about 20° and 35°.

Since the product of the second step is generally insoluble in the solvent, agitation of the slurry should be maintained during this third step. Depending on the reactivity of the isocyanate or isothiocyanate reagent, this step may also be as short as ten minutes, although 45 minutes to an hour is generally preferred, with longer times being possible in any event and desirable for less active reagents such as the isothiocyanates.

During this step in the preparation of certain of the compounds, the suspended solid may seem to disappear and then reappear as the insoluble final product. This phenomenon may be explained by postulating a transient intermediate which is soluble in the solvent. Such an intermediate might be a ring compound with bonds from the amino nitrogen atom, to the isocyanate (or isothiocyanate) carbon atom, to the phosphonothioureido sulfur atom.

Step 4.—Filtration or centrifugation and decanting may be used to effect recovery of the solid product, along with the salt formed during the first step. The salt may be removed by water wash if desired.

EXAMPLES

The following examples are presented to illustrate the preferred manner in which the process of the present invention may be carried out to produce various desired products and are not to limit the scope of the appended claims. The products are in accordance with the following formula:

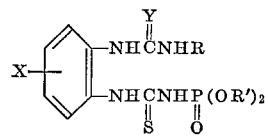

wherein X, Y, R and R' are as defined hereinabove.

EXAMPLE 1

Preparation of 1-(3-diethylphosphonothioureido)-2-(3-(4-methylbenzene)sulfonylthioureido)benzene To a suspension of potassium thiocyanate (0.1 mol) in 50 ml. of anhydrous glyme, diethyl chlorophosphate (0.1 mol) is added with external cooling to maintain room temperature. The thick suspension formed is stirred at room temperature for 18 hours. I have found, however, that as short a reaction time as one-half hour (and preferably two hours) produces similarly acceptable results. A 70% yield of diethylphosphonoisothiocyanate may be assumed for this particular reaction (percent yield) in general being determined performing the same reaction and isolating the product. To the suspension is added o-phenylenediamine (0.07 mol) with external cooling to maintain room temperature. The suspension is stirred at room temperature for 45 minutes, and to it is added the p-tolylsulfonyl isocyanate (0.07 mol). The suspension is stirred at room temperature for 45 minutes and then vacuum filtered. The first crop is thoroughly washed with water and then dried.

EXAMPLE 2

Preparation of other 1-(3-dialkylphosphonothioureido)-2-(3-arylsulfonylureido or alkylsulfonylureido)benzene compounds The compounds indicated in Table 2A by their substituents in the general formula given above and hereinafter designated compounds A through G, may be prepared in accordance with the present invention, preferably using reaction parameters such as those given in Table 2B.

TABLE 2A

| Compound | R | R' | X | Y |
|---|---|---|---|---|
| A | $CH_3$–〈 〉–$SO_2$– | $CH_3CH_2$– | H | O |
| B | $Cl$–〈 〉–$SO_2$– | $CH_3CH_2$– | H | O |
| C | 〈 〉–$SO_2$– | $CH_3CH_2$– | H | O |
| D | (naphthyl)–$SO_2$– | $CH_3CH_2$– | H | O |
| E | $NO_2$–〈 〉–$SO_2$– | $CH_3CH_2$– | H | O |
| F | $(CH_3)_2N$–〈 〉–$SO_2$– | $CH_3CH_2$– | H | O |
| G | $CH_3CH_2CH_2CH_2$–$SO_2$– | $CH_3CH_2$– | H | O |

TABLE 2B

| Run | Compound | Solvent (ml.) | Metal thiocyanate mol | Alkyl chlorophosphate, mol | Step 1 Time, hours | Step 1 Temp. | Step 2 Diamine, mol | Step 2 Time, hours | Step 2 Temp. | Step 3 Isocyanate or isothiocyanate, mol | Step 3 Time, hours | Step 3 Temp. |
|---|---|---|---|---|---|---|---|---|---|---|---|---|
| 2-1 | A | Glyme (50) | KSCN (0.1) | 0.1 | 2 | Reflux | 0.055 | ½ | R.T. | 0.055 | ½ | R.T. |
| 2-2 | A | Benzene (100) | KSCN (0.1) | 0.1 | 2 | do | 0.030 | ½ | R.T. | 0.030 | ½ | R.T. |
| 2-3 | B | Glyme (50) | KSCN (0.1) | 0.1 | 2 | do | 0.055 | ½ | R.T. | 0.055 | ¼ | R.T. |
| 2-4 | C | do | KSCN (0.1) | 0.1 | 2 | do | 0.055 | ½ | R.T. | 0.055 | 18 | R.T. |
| 2-5 | D | do | KSCN (0.1) | 0.1 | 2 | do | 0.055 | ½ | R.T. | 0.055 | 18 | R.T. |
| 2-6 | E | do | NaSCN (0.1) | 0.1 | 2 | do | 0.055 | ½ | R.T. | 0.055 | 24 | R.T. |
| 2-7 | F | do | KSCN (0.1) | 0.1 | 2 | do | 0.055 | ½ | R.T. | 0.055 | ½ | R.T. |
| 2-8 | G | do | KSCN (0.1) | 0.1 | 2 | do | 0.055 | ½ | R.T. | 0.055 | 18 | R.T. |

EXAMPLE 3

Preparation of 1-(3-dialkylphosphonothioureido)-2-(3-arylsulfonylthioureido or alkylsulfonylthioureido) benzene compounds The compounds indicated in Table 3A and hereinafter designated Compounds H through L, may be prepared in accordance with the present invention, preferably using reaction parameters such as those given in Table 3B.

TABLE 3A

| Compound | R | R' | X | Y |
|---|---|---|---|---|
| H | $CH_3$–〈 〉–$SO_2$– | $CH_3CH_2$– | H | S |
| I | $CH_3SO_2$– | $CH_3CH_2$– | H | S |
| J | $CH_3CH_2SO_2$– | $CH_3CH_2$– | H | S |
| K | $CH_3SO_2$– | $CH_3$–$\overset{CH_3}{\underset{|}{CH}}$– | H | S |
| L | $CH_3SO_2$– | $CH_3$–$CH_2$– | p-Cl | S |

TABLE 3B

| Run | Compound | Solvent (ml.) | Metal thiocyanate (mol.) | Alkyl chlorophosphate (mol.) | Step 1 Time, hrs. | Step 1 Temp. | Step 2 Diamine, mol. | Step 2 Time, hrs. | Step 2 Temp. | Step 3 Isocyanate or isothiocyanate, mol. | Step 3 Time, hrs. | Step 3 Temp. |
|---|---|---|---|---|---|---|---|---|---|---|---|---|
| 3-1 | H | Glyme (50) | $NH_4SCN$ (0.1) | 0.1 | 2 | Reflux | 0.048 | ½ | R.T. | 0.048 | 24 | R.T. |
| 3-2 | H | do | KSCN (0.1) | 0.1 | 2 | do | 0.055 | ½ | R.T. | 0.055 | 24 | R.T. |
| 3-3 | I | do | KSCN (0.1) | 0.1 | 2 | do | 0.055 | ½ | R.T. | 0.055 | ½ | R.T. |
| 3-4 | I | Ether (100) | $Ba(SCN)_2$ (0.05) | 0.1 | 2 | do | 0.040 | ½ | R.T. | 0.040 | ½ | R.T. |
| 3-5 | J | Glyme (50) | KSCN (0.1) | 0.1 | 2 | do | 0.055 | ½ | R.T. | 0.055 | 18 | 35° |
| 3-6 | J | Benzene (100) | KSCN (0.1) | 0.1 | 2 | do | 0.030 | ½ | R.T. | 0.030 | 18 | 35° |
| 3-7 | K | Glyme (50) | NaSCN (0.1) | 0.1 | 2 | do | 0.055 | ½ | R.T. | 0.055 | ¼ | R.T. |
| 3-8 | L | do | KSCN (0.1) | 0.1 | 2 | do | 0.055 | 4 | R.T. | 0.055 | ½ | R.T. |

EXAMPLE 4

Preparation of 1-(3-dialkylphosphonothioureido)-2-(3-aroylureido) benzene compounds The compounds indicated in Table 4A and hereinafter designated Compounds M and N, may be prepared in accordance with the present invention, preferably using reaction parameters such as those given in Table 4B.

TABLE 4A

| Compound | R | R' | X | Y |
|---|---|---|---|---|
| M | $NO_2$-C$_6$H$_4$-C(O)- | CH$_3$CH$_2$- | H | O |
| N | CH$_3$-C$_6$H$_4$-C(O)- | CH$_3$CH$_2$- | H | O |

TABLE 4B

| | | | Step 1 | | | | Step 2 | | | Step 3 | | |
|---|---|---|---|---|---|---|---|---|---|---|---|---|
| Run | Compound | Solvent (ml.) | Metal thiocyanate (mol.) | Alkyl chlorophosphate, (mol.) | Time, hrs. | Temp. | Diamine, mol. | Time, hrs. | Temp. | Isocyanate or isothiocyanate, mol. | Time, hrs. | Temp. |
| 4-1 | M | Ether (100) | KSCN (0.1) | 0.1 | 2 | Reflux | 0.045 | ½ | R.T. | 0.045 | ½ | R.T. |
| 4-2 | M | Glyme (50) | KSCN (0.1) | 0.1 | 2 | ...do | 0.055 | ½ | R.T. | 0.055 | ½ | R.T. |
| 4-3 | N | ...do | KSCN (0.1) | 0.1 | 2 | ...do | 0.055 | ½ | R.T. | 0.055 | ¼ | R.T. |
| 4-4 | N | ...do | Ca(SCN)$_2$ (0.05) | 0.0 | 2 | ...do | 0.040 | ½ | R.T. | 0.040 | ¼ | R.T. |

EXAMPLE 5

Preparation of 1 - (3 - dialkylphosphonothioureido)-2-(3 - acylthioureido or aroylthioureido) benzene compounds The compounds in Table 5A and hereinafter designated Compounds O through V, may be prepared in accordance with the present invention, preferably using reaction parameters such as those given in Table 5B.

TABLE 5A

| Compound | R | R' | X | Y |
|---|---|---|---|---|
| O | CH$_3$-C(O)- | CH$_3$CH$_2$- | H | S |
| P | ClCH$_2$-C(O)- | CH$_3$CH$_2$- | H | S |
| Q | CH$_3$CH$_2$-C(O)- | CH$_3$CH$_2$- | H | S |
| R | CH$_3$-C(O)- | CH$_3$CH$_2$- | p-Cl | S |
| S | C$_6$H$_5$-C(O)- | CH$_3$CH$_2$- | H | S |
| T | CH$_3$-C$_6$H$_4$-C(O)- | CH$_3$CH$_2$- | H | S |
| U | CH$_3$-C(O)- | ClCH$_2$CH$_2$- | H | S |
| V | Cl$_3$C-C$_6$H$_4$-C(O)- | CH$_2$CH$_2$- | H | S |

1. A process for preparing a desired compound of the formula

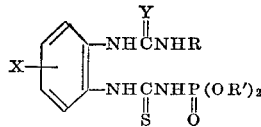

wherein in each of the formulas of this claim,

Y is O or S;

R is lower alkyl sulfonyl, benzenesulfonyl, substituted benzenesulfonyl wherein the substituents are selected from lower alkyl, nitro, halo, lower alkoxy, halo-lower alkyl, dialkylamino, or a trimethylene group bonded to the 3,4-adjacent carbons, lower acyl, benzoyl or substituted benzoyl wherein the substituents are selected from lower alkyl, nitro, halo, lower alkoxy, halo-lower alkyl, dialkylamino or CCl$_3$.

R' is lower alkyl, lower alkoxyalkyl, halo-lower alkyl, phenyl or substituted phenyl wherein the substituents are selected from lower alkyl, nitro, halo, lower alkoxy, halo-lower alkyl or dialkylamino; and X represents from one to four substituents which may independently be hydrogen, lower alkyl, lower alkoxy or halogen;

step 1—bringing together in an inert, water-free organic solvent boiling at least 30° C. and in which the organic reagents of said process are soluble, substantially equimolar amounts of the following: (a) the thiocyanate salt of a cation having a water-soluble chloride and (b) a chlorophosphate having the formula

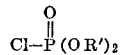

and permitting them to react at a temperature between about 10° and 90° C. for at least about one-half hour with agitation, whereby the following intermediate is formed: (c) the phosphonoisothiocyanate having the formula

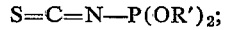

step 2—adding to the reaction mixture resulting from step 1 the following: (d) the di-amino benzene com-

TABLE 5B

| | | | Step 1 | | | | Step 2 | | | Step 3 | | |
|---|---|---|---|---|---|---|---|---|---|---|---|---|
| Run | Compound | Solvent (ml.) | Metal thiocyanate (mol) | Alkyl chlorophosphate (mol) | Time, hrs. | Temp. | Diamine (mol) | Time, hrs. | Temp. | Isocyanate or isothiocyanate (mol) | Time, hrs. | Temp. |
| 5-1 | O | Glyme (50) | KSCN (0.1) | 0.1 | 2 | Reflux | 0.055 | ½ | R.T. | 0.055 | ½ | R.T. |
| 5-2 | O | Ether (100) | KSCN (0.1) | 0.1 | 2 | ...do | 0.045 | ½ | R.T. | 0.045 | ½ | R.T. |
| 5-3 | P | Glyme (50) | KSCN (0.1) | 0.1 | 2 | ...do | 0.055 | ½ | R.T. | 0.055 | 24 | R.T. |
| 5-4 | P | ...do | NaSCN (0.1) | 0.1 | 2 | ...do | 0.055 | ½ | R.T. | 0.055 | 24 | R.T. |
| 5-5 | Q | Toluene(100) | KSCN (0.1) | 0.1 | 2 | ...do | 0.040 | ¼ | R.T. | 0.040 | ¼ | R.T. |
| 5-6 | Q | Glyme (50) | LiSCN (0.1) | 0.1 | 2 | ...do | 0.050 | ½ | R.T. | 0.050 | ¼ | R.T. |
| 5-7 | R | ...do | NaSCN (0.1) | 0.1 | 2 | ...do | 0.055 | 4 | R.T. | 0.055 | 4 | R.T. |
| 5-8 | S | ...do | KSCN (0.1) | 0.1 | 2 | ...do | 0.055 | ½ | R.T. | 0.055 | 24 | R.T. |
| 5-9 | S | ...do | NH$_4$SCN (0.1) | 0.1 | 2 | ...do | 0.048 | ½ | R.T. | 0.048 | 24 | R.T. |
| 5-10 | T | Methylene dichloride (50). | KSCN (0.1) | 0.1 | 2 | ...do | 0.030 | ½ | R.T. | 0.030 | 24 | R.T. |
| 5-11 | T | Glyme (50) | KSCN (0.1) | 0.1 | 2 | ...do | 0.055 | ½ | R.T. | 0.055 | 24 | R.T. |
| 5-12 | U | ...do | KSCN (0.1) | 0.1 | 2 | ...do | 0.055 | 2 | R.T. | 0.055 | 3 | R.T. |
| 5-13 | V | ...do | KSCN (0.1) | 0.1 | 2 | ...do | 0.055 | ½ | R.T. | 0.055 | 5 | R.T. | pound having the formula

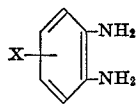

in an amount which is substantially equimolar with said phosphonoisothiocyanate (c) and permitting it to react at a temperature below about 50° C. for at least about ten minutes with agitation, whereby the following intermediate is formed: (e) the benzene compound having the formula

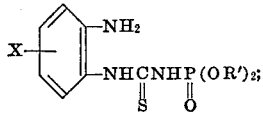

step 3—adding to the reaction mixture resulting from step 2 the following: (f) the isocyanate or isothiocyanate having the formula R—N=C=Y in an amount which is at least substantially equimolar with said benzene compound (e) and permitting it to react at a temperature between about 10° and 80° C. for at least about ten minutes with agitation, whereby said desired compound is formed; and step 4—separating said desired compound from the reaction mixture.

2. The process of claim 1, wherein said inert, water-free organic solvent is glyme, diethyl ether, ethyl acetate, butyl acetate, methylene dichloride, ethylene dichloride, chloroform, carbon tetrachloride, acetonitrile, benzene, or a mixture thereof.

3. The process of claim 2, wherein said inert, water-free organic solvent is glyme.

4. The process of claim 1, wherein from about 300 ml. to about 5 liters of solvent are present per mol of product to be made.

5. The process of claim 1, wherein said thiocyanate salt (a) is NaSCN, KSCN, LiSCN, Ca(SCN)$_2$, Ba(SCN)$_2$, NH$_4$SCN, or a mixture thereof.

6. The process of claim 1, wherein said step 1 comprises the following operations:
operation 1a—adding said thiocyanate salt (a) to said solvent, and then
operation 1b—adding said chlorophosphate (b) to the mixture.

7. The process of claim 1, wherein said step 4 comprises the following operations:
operation 4a—separating the solids from the reaction mixture by filtration, and then
operation 4b—washing the separated solids with water to remove water-soluble impurities.

8. The process of claim 1, wherein the desired compound is a 1-(3-dialkylphosphonothioureido)-2-(3 - arylsulfonylureido) benzene compound.

9. The process of claim 8, wherein the desired compound is:

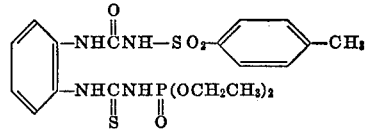

10. The process of claim 1, wherein the desired compound is a 1-(3-dialkylphosphonothioureido) - 2 - (3-alkylsulfonylthioureido) benzene compound.

11. The process of claim 10, wherein the desired compound is

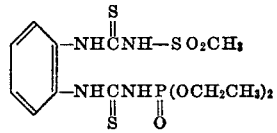

References Cited
FOREIGN PATENTS
952,712  10/1956  Germany _____ 260—938

ANTON H. SUTTO, Primary Examiner

U.S. Cl. X.R.
260—938; 424—211

Disclaimer 3,845,176.—*W. David Weir*, Levittown, Pa. PROCESS FOR MAKING PHOSPHONOTHIOUREIDES. Patent dated Oct. 29, 1974. Disclaimer filed Mar. 31, 1981, by the assignee, *Beecham, Inc.*

Hereby enters this disclaimer to all of the claims of said patent.

[*Official Gazette November 17, 1981.*]